United States Patent [19]
Lotz et al.

[11] Patent Number: 5,902,544
[45] Date of Patent: May 11, 1999

[54] CONTINUOUS STEEL CASTING PLANT WITH FOLLOWING CROSS-CUTTING AND SLITTING EQUIPMENT FOR OXY-TORCH CUTTING OF HOT AND COLD STRANDS

[75] Inventors: Horst Karl Lotz, Hofheim-Wallau; Herr Alexander Deica, Hünstetten-Wallbach; Wigbert Buhr, Hohrhausen, all of Germany

[73] Assignee: Gega Corp., Pittsburgh, Pa.

[21] Appl. No.: 08/769,836

[22] Filed: Dec. 19, 1996

[30] Foreign Application Priority Data

Dec. 20, 1995 [EP] European Pat. Off. .............. 95120221

[51] Int. Cl.$^6$ ...................................................... B23K 7/00
[52] U.S. Cl. ................................................. 266/50; 266/48
[58] Field of Search .......................................... 266/48, 50

[56] References Cited

U.S. PATENT DOCUMENTS 2,521,199  9/1950  Babcock ..................................... 266/48

*Primary Examiner*—Scott Kastler
*Attorney, Agent, or Firm*—Alan G. Towner; Eckert Seamans Cherin & Mellott, LLC

[57] ABSTRACT

A high pressure oxygen torch system for cutting steel is disclosed. The system includes a high pressure nozzle which operates at oxygen pressures of approximately 20 bar and above. The system also includes a pressure regulating valve and a mass flow control valve which maintain uniform pressure within close tolerances. The oxygen torch system may be used in continuous steel casting operations to economically, reliably and quickly cut hot and cold strands.

9 Claims, 6 Drawing Sheets

CONTINUOUS STEEL CASTING PLANT WITH FOLLOWING CROSS-CUTTING AND SLITTING EQUIPMENT FOR OXY-TORCH CUTTING OF HOT AND COLD STRANDS

BACKGROUND INFORMATION

The economic and fast torch cutting of different thicknesses of steel with oxygen has had an unchanged importance for more than 60 years, because of the meaning of continuous casting of steel it became an even more important development work in research and in practice. Roger S. Babcock explains in his patent U.S. Pat. No. 2,521,199 according to application dated Jun. 14, 1947 his conclusions and suggestions for economic fast cutting with high pressures of 450 PSI (31.7 bar) to 600 PSI (35.2 bar) and divergent nozzles. Many of these conclusions are still valid, however, the high-oxygen cutting was not accepted in the fields in which approx. 15 bar nozzle supply pressure= working pressure is used today, even though there have been numerous developments and practical tests because of the possible advantages. A proper, permanent, reliable operation with gaseous high pressure oxygen of 15 to over 100 bar working pressure did not seem possible.

Although the outlet pressures and the jet speeds during high-pressure oxygen cutting were known and could be influenced, the operational influences and circumstances were not considered, as Roger S. Babcock showed poorly in FIG. 1 of his a.m. patent. A pressure and flow control of the cutting oxygen by a liquid oxygen pump in front of an evaporator (2) with a receptacle behind also used for pressure measurement and a pressure switch that turns the pump motor on and off was absolutely insufficient. In addition there was only a shutoff valve for turning the cutting oxygen on and off. With the described supply and pipe system and its very general definition of nozzle measurements, good cutting results were achieved under test circumstances, however, not permanently in practical operation. This also applies for all known equipment for high pressure oxygen-torch cutting, apart from torch cutting with liquid oxygen where minimum pressure deviations are of minor influence.

SUMMARY OF THE INVENTION

The following described invention is based on the discovery that contrary to conventional torch cutting with oxygen below approx. 15 bar with more or less minor influences by pressure alterations, higher pressures, greater quantities and therefore higher oxygen speed, small and long cross sections in the pipe system above all high pressure loss and minor changes of pressure, temperature and throughput rate mean great deviations of jet energy required for safe, good and fast cutting. This applies especially when the nozzle design and manufacturing is too inaccurate or for a too wide application range, or when a favorable operational condition can only be achieved if it is randomly set within the limits.

For example, cutting results from trials confirming this invention were not repeatable if slightest deviations were accepted for these trials. Based on this discovery it was concluded that for cutting with higher cutting oxygen pressure, which is necessary for achieving good cutting results, every application has to have a certain, surely available working pressure within minimal pressure tolerance at reliable high cutting speed, good cutting quality and small cutting kerf. Therefore it has to be refrained from a large production series of certain types of nozzles applicable to a wide range of pressures. E.g. for a pressure tolerance of +/−0.1 bar a special cutting nozzle has to be calculated, designed, refined by trials and precisely manufactured. The refining by trials is above all required for adjustment of the best possible heating to the respective cutting channel (10) with its cutting oxygen separation jet at a certain pressure and for different heating gases. It increases the number of the necessary cutting nozzle designs to enable safe, fast and good cutting with high pressure oxygen for every individual case. Only this way the energy which is available through the higher pressure can be converted effectively to a high degree into jet speed for better blowing out of the slag of the separation kerf and therefore leads to increase of cutting speed. A good heating supports this by making the slag more liquid.

A second discovery forced a preliminary restriction to a smaller range of high pressure oxygen due to safety and economic reasons, i.e. high pressure oxygen of 20 bar or higher is usually not available in economically sufficient amounts at steel works. For safety, economic and purchase reasons the common works' supply systems have only an oxygen pressure of 10 bar (Japan) up to maximum 25 bar (Europe and others). The oxygen is also used for other equipment, e.g. for oxygen blowing during steel making, at times to a high degree, which causes great pressure fluctuations. The use of additional high pressure pumps with buffer containers and all necessary safety devices was and still is very awkward and expensive and anyway unreasonable due to difficulties with high pressure oxygen-separation nozzles designed for a wide range of pressures and supplied insufficiently.

In contrast to that, the economic high pressure oxygen supply of about 20 to 35 bar is given for continuous steel casting plants if you rent tanks (1) refillable with liquid oxygen and evaporators (2) from oxygen producers and connect them with the continuous steel casting plant via tie line or ring system. The tanks' (1) capacity and performance is limited, however, it is sufficient to supply several cutting torches (5) dependent on duration of operation. For example, a corresponding, usual tank (1) with evaporator (2) supplies approx. 400 $Nm^3$ oxygen at 37 bar. A separation nozzle (6) developed according to the resulting certain working pressure requires 90 to 120 $Nm^3$ per hour at 100% operation. The supply from the works' supply system with 20 to 25 bar is rarely available and often subject to pressure fluctuations. Torch cutting with this medium pressure is only useful for borderline cases where the supply is more constant and a modest improvement of previously usual cutting speeds already justifies the effort. This also applies for the use of oxygen compressors and supply system pressure increase. However, in both cases the exact pressure and flow regulation, especially for operation of the high pressure oxygen-separation nozzles (6) which are sensitive to pressure fluctuations, is of great importance. The pressure loss from these tanks (1) or buffer containers to the point of consumption vary and demand a special separation nozzle (6) designed according to the available dynamic working pressure.

DESCRIPTION OF THE PREFERRED EMBODIMENTS

Figure 1:
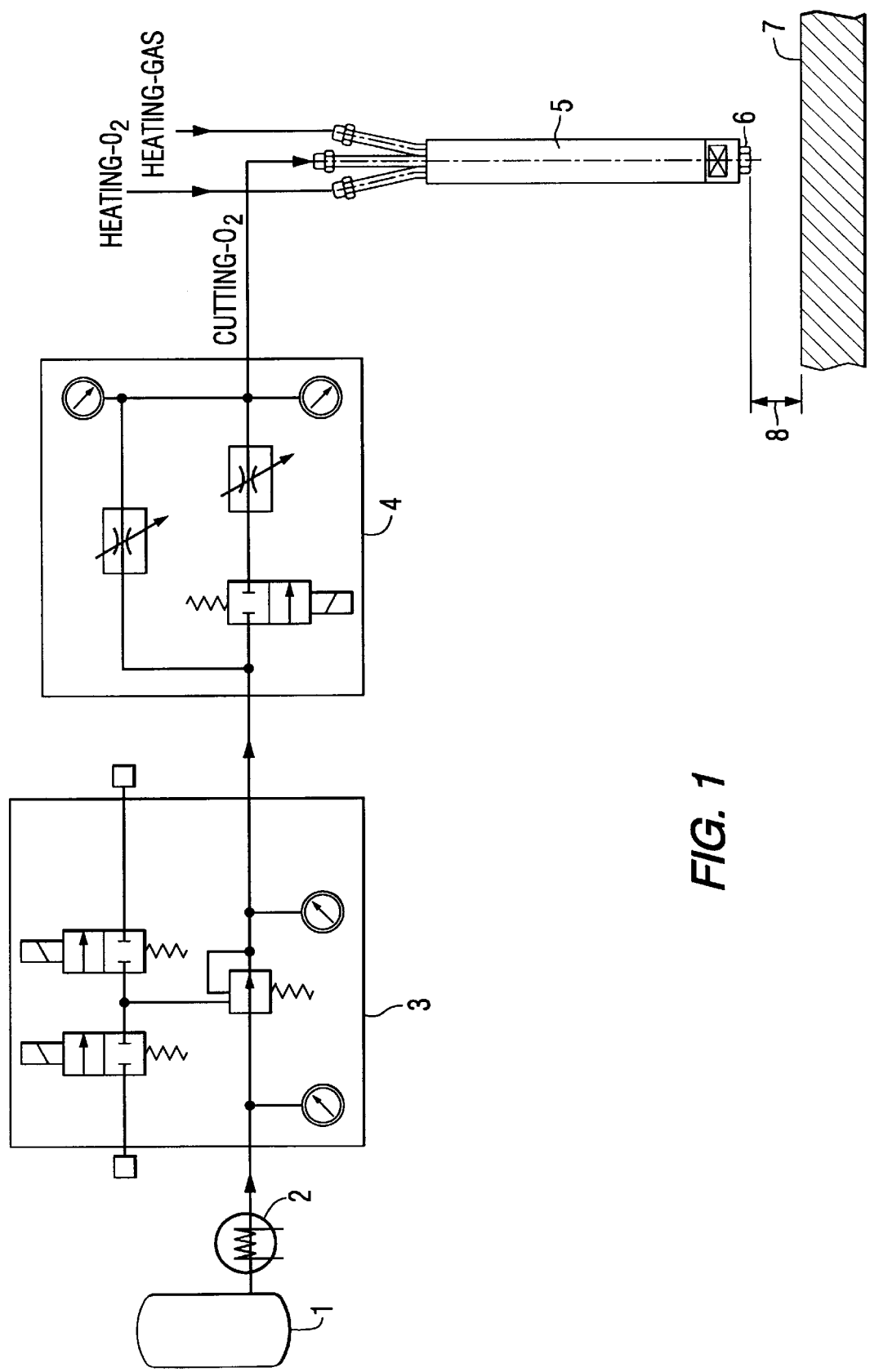
FIG. 1 shows the high pressure oxygen separation system of the present invention.
Figure 2:
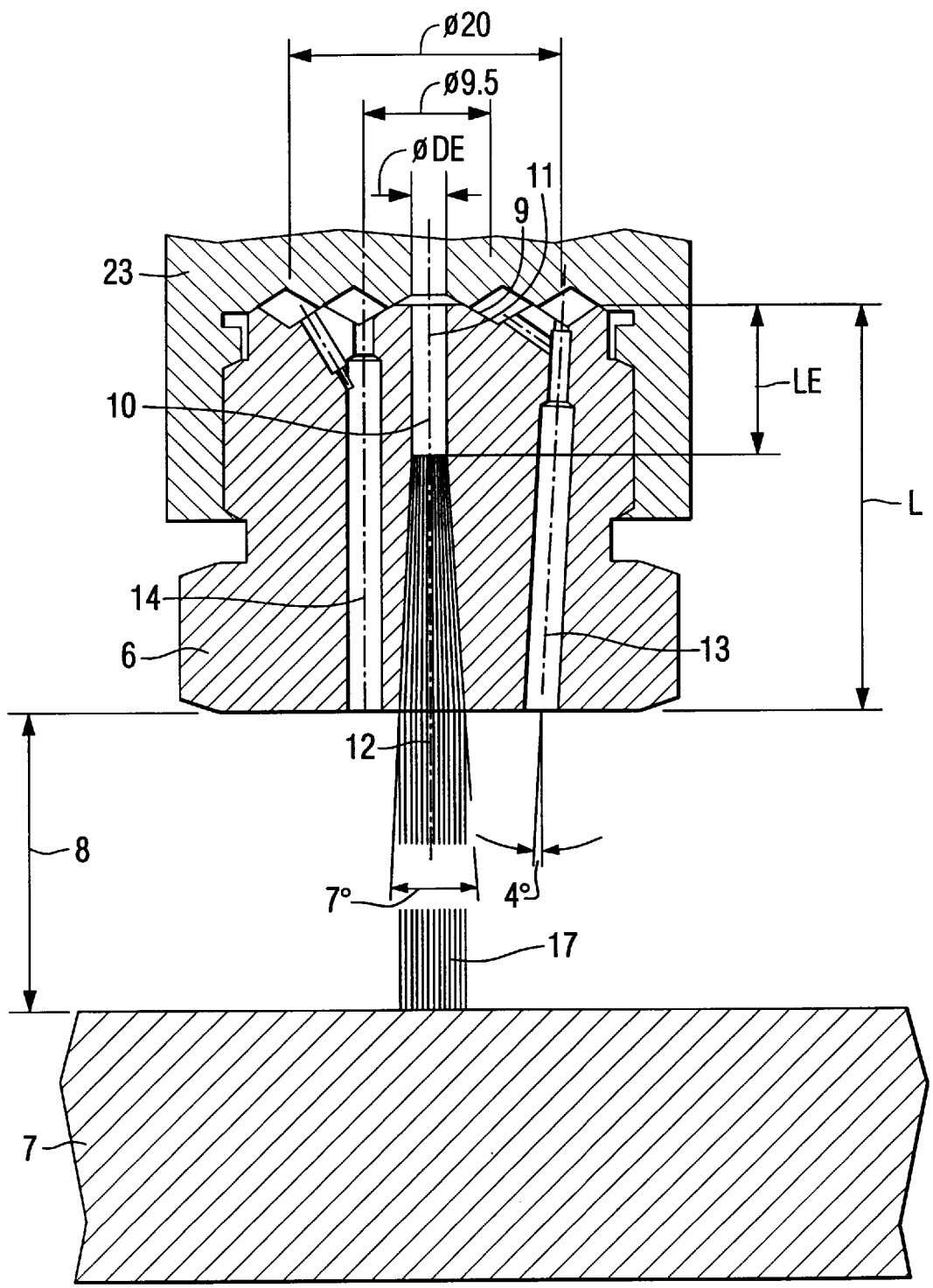
FIG. 2 shows the separation nozzle of the present invention.

According to the invention and as shown in FIG. 1, the high pressure oxygen-separation system, which is herewith applied for a patent, located behind a tank (1) filled with oxygen and an evaporator (2), consists of:

1) an oxygen-regulating valve (3) which can keep the exact balanced pressure in order to bring a supply pressure of e.g. 37 bar or similar to an exact working pressure at the separation nozzle (6) of e.g. 26.2 bar for which this nozzle is designed and manufactured.
2) an exactly adjusted mass-flow valve according to EPA 91115993.7 for avoiding or decreasing of the separation nozzle's nozzle back effect on pressure and quantity regarding the high pressure oxygen flow between the oxygen-regulating valve (3) and the mass-flow valve (4) for supplying the cutting torch and its separation nozzle (6). These nozzle back effects are caused by wear, splashing with slag, and alteration of nozzle distance (8) towards the strand (7) e.g. during initial cutting.
3) a high pressure oxygen-cutting torch (5) for the distinctive holder for a high pressure oxygen-separation nozzle (6) designed for one certain working pressure.
4) a high pressure oxygen-separation nozzle (6) which is calculated, designed, adjusted by trials, precisely manufactured for one certain working pressure and only fits into a high pressure oxygen-cutting torch (5) especially designed for it. We point out that the high oxygen pressure-separation nozzles (6) are short block-shaped nozzles according to European patent no. 0097883 whose flow loss of cutting oxygen in the cutting channel (10) is low due to its special shortness. Following cutting results were achieved with above mentioned system, under consideration of operational conditions as described before, and are to be considered in comparison. The following table shows the essential measures of the nozzle geometry determined for this system, i.e. narrowest nozzle cross section DE, nozzle outlet cross section DA and angle of inlet a between DE and DA. In the following Table 1, a conventional nozzle according to European patent no. 0097883 is compared with a separation nozzle of the present invention comprising saw tooth guide channels sealed to the cutting torch as shown in FIG. 2.

TABLE 1

Nozzle comparison

|  | Conventional Nozzle of EP0097883 | High Pressure Oxygen Nozzle of the Present Invention |
|---|---|---|
| Separation oxygen | | |
| working pressure (bar) | approx. 14 | 26.3 +/− 0.1 |
| temperature (° C.) | 20 | 20 |
| throughput rate (Nm³/h). | 45 | 90 |
| Nozzle | | |
| DE (mm) | 3.6 | 2.6 |
| DA (mm) | 4.3 | 4.9 |
| angle of cone a (°) | 7.5 | 7 |

TABLE 1-continued

Nozzle comparison

|  | Conventional Nozzle of EP0097883 | High Pressure Oxygen Nozzle of the Present Invention |
|---|---|---|
| impact force of steel (g) | approx. 1000 | approx. 2300 |
| width of cutting kerf (mm) | average 6.2 | average 6.9 |
| cutting speed (mm/min) at 20° C. | 250 | 360 |
| for C-steel with low C-content at 750° C. and 250 mm thickness | 380 | 580 |

As shown in FIG. 2, the separation nozzle (6) is designed as a block-shaped nozzle similar to the fast cutting nozzles described in EP 0097883 which are only developed for operation with 10 to 15 bar. However, unlike these nozzles the sealing surface of the separation nozzle (6) towards the corresponding sealing surface of the cutting torch (5) was not designed as a flat sealing surface with ring channels and flat sealings (30) in front, behind and between, but as a new sealing surface with saw tooth-guide channels (9). Due to the higher working pressures and the therefore necessary better sealing, the individual gas-containing ring channels are designed as conical, suitable into the sealing surface of the cutting torch (5), slightly put-in rings which look like saw teeth in the cross section. Such conical surfaces pressed together in one another by screws located at cutting torch (5) and separation nozzle (6) can be brought with less force to an even better sealing behavior than other direct metallic sealings.

This separation nozzle (6) in accordance with an embodiment of the present invention was precisely calculated on the basis of a constantly available working pressure for an impact force of steel of at least the double of the conventional cutting nozzles which are approx. 1000 g at comparable diameter of the cutting jets (17). First cutting channels (10) with inlet (11) of a certain diameter and certain length and with outlet (12) of certain measures of a cone bore are determined, all as described in before mentioned table. Then the pitch circle diameter of the known heating flame bores (13, 14) and its angle of slope towards the cutting jet (17) has to be determined empirically. During this procedure a heat generation as high as possible has to be guaranteed very close around the cutting jet (17) without disturbing the cutting jet itself.

Figure 3:
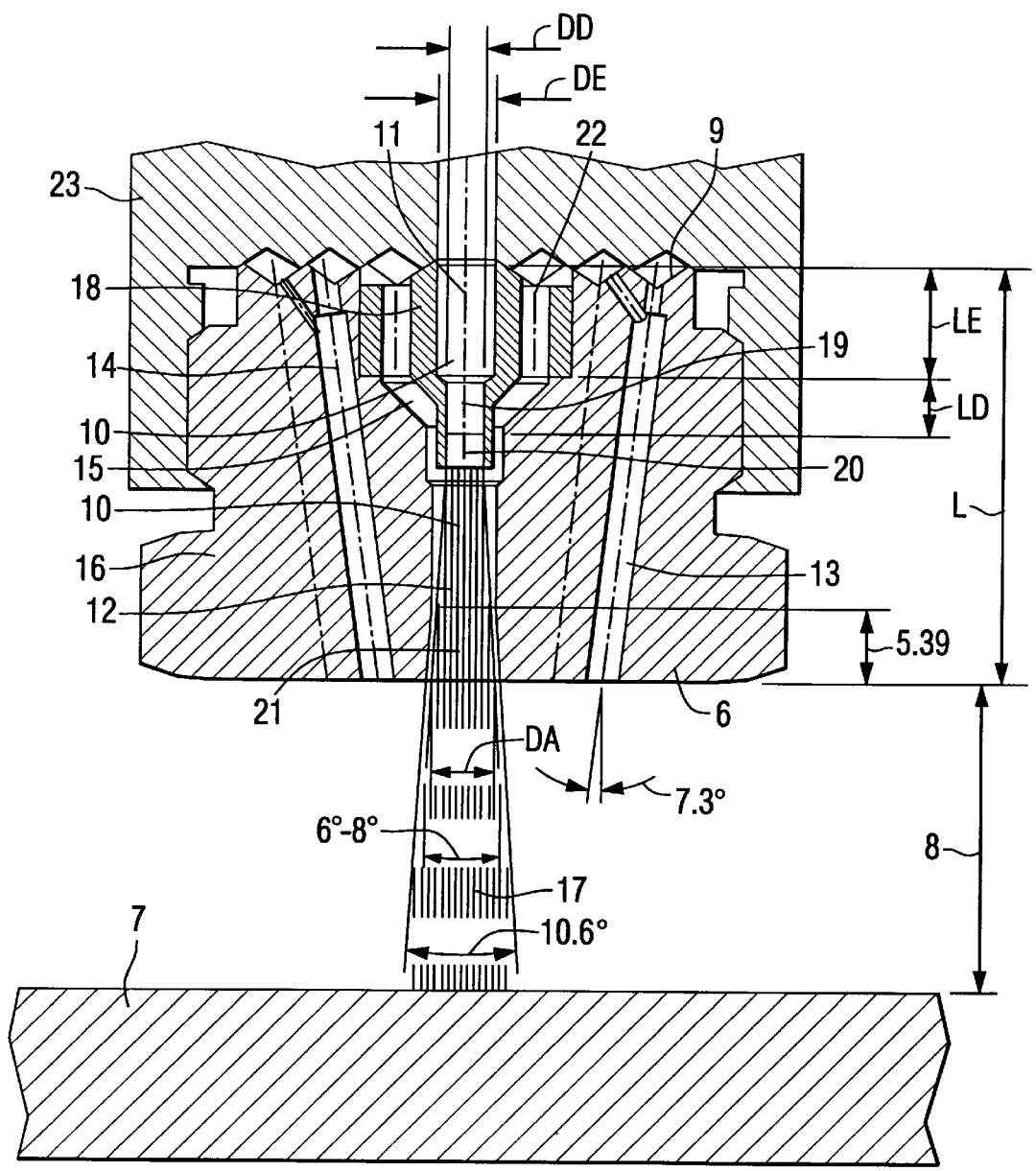
FIGS. 3 and 4 show further embodiments of the separation nozzle of the present invention.

FIG. 3 shows a further developed separation nozzle (6) according to this patent application which contains an insert called the jet part (18) and helps to create a double cutting jet (17) with joint central axis. This double cutting jet (17) has a core jet of oxygen with higher pressure and a ring jet of oxygen with lower pressure in the separation nozzle (6). The ring jet of oxygen with lower pressure protects the core of the cutting jet (17) already in the separation nozzle (6) against friction and therefore turbulences and loss. With that a better cutting surface is possible, however, the highest possible cutting speed becomes slightly less and the working pressure has to be set a little higher when designing. According to the invention the separation nozzle (6) consists of a heating part (16), the empirically adjusted outer (13) and inner (14) heating flame channels with known heating performance, and the injector area (15) with the outlet (12) of the cutting channel (10) starting there with following post-outlet (21) designed as a frustum of a cone of 10° to 11° starting from diameter DA of the outlet (12). This jet part (18) is inserted non-exchangeable in a cylindrical and following conical cavity consisting of the jet part (18) and injector area (15). Besides 12 feed bores (22) merging into the conical part of the injector area (15) it has a part of the complete cutting channel (10) consisting of an inlet (11), with inlet diameter DE, with following pre-nozzle part (19), with diameter DD, and with a conical pre-outlet (20) which merges into the injector area (15) at an 6–8° angle and from there into the outlet (12) of the complete cutting channel (10) in the heating part (16). The low pressure cutting oxygen passing into the injector area (15) through the feed bores (22) of the cutting part (18) creates a double jet with soft ring jet on the outside and hard core jet on the inside. The ring jet adjacent directly to the core jet prevents a great creation of whirls at the cutting channel's (10) wall and at the outlet area of the separation nozzle (6). With that occurring considerable energy losses as well as contamination of the core-cutting oxygen by heating flame gases are prevented.

Figure 4:
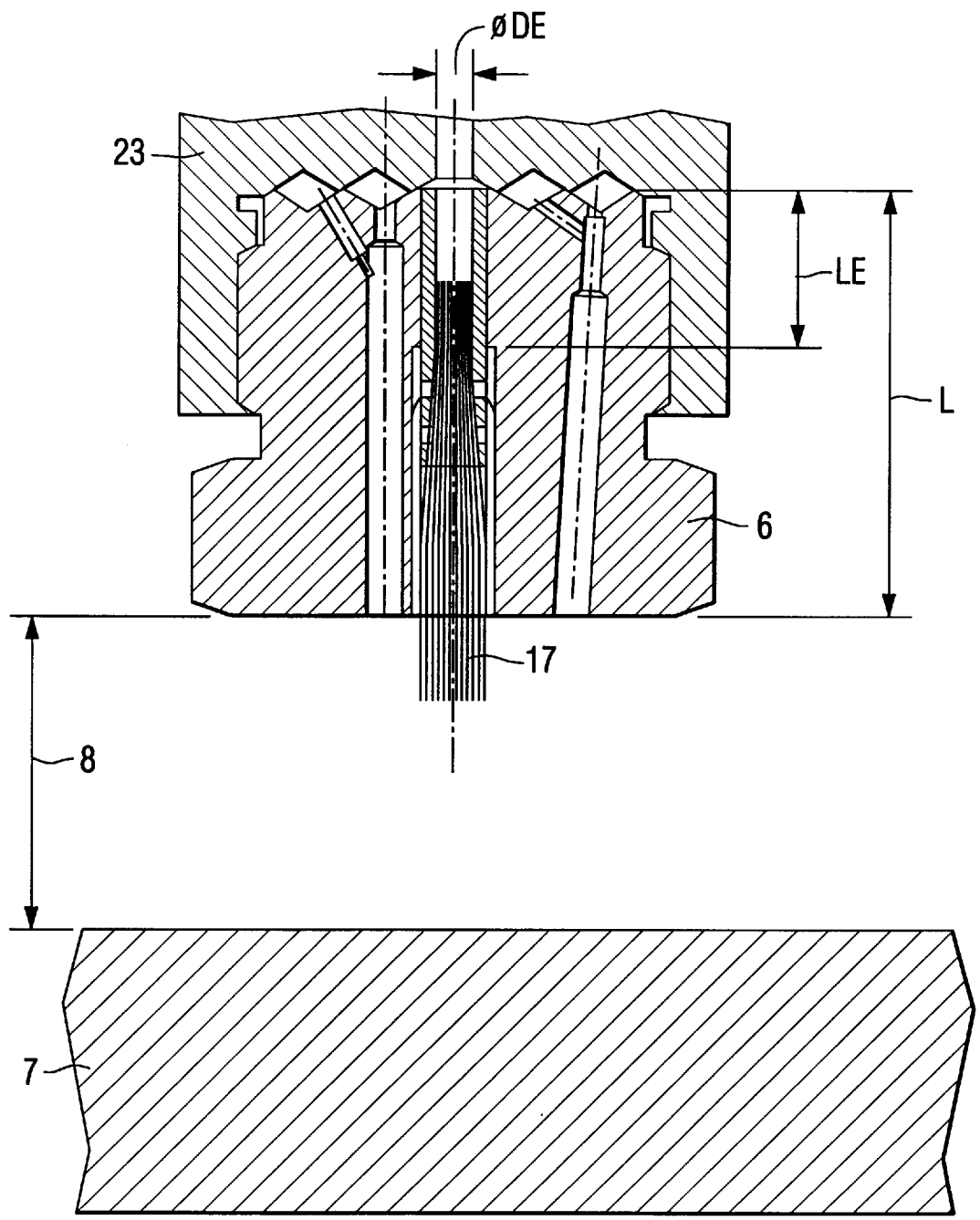

A similar solution for a separation nozzle (6) according to the herewith claimed patent is shown in FIG. 4. The separation nozzle (6) shown in FIG. 2 is corresponding to the one in FIG. 4, but this one has a cutting channel (10) with a jet part (18) which consists of a sleeve firmly inserted into the separation nozzle (6). This sleeve is gas permeable by bores, kerfs, or porosity so that the slowing down of the cutting jet (17) caused by friction at the inner sleeve wall with whirling and pressure increases are offset by draining off through the sleeve wall into a kind of injector area (15). Then the slower, filtered cutting oxygen as a ring jet is accelerated by the friction-free core jet. For that purpose the porous jet part (18) is in the injector area (15) whose diameter is larger than the one of the jet part (18).

Figure 5:
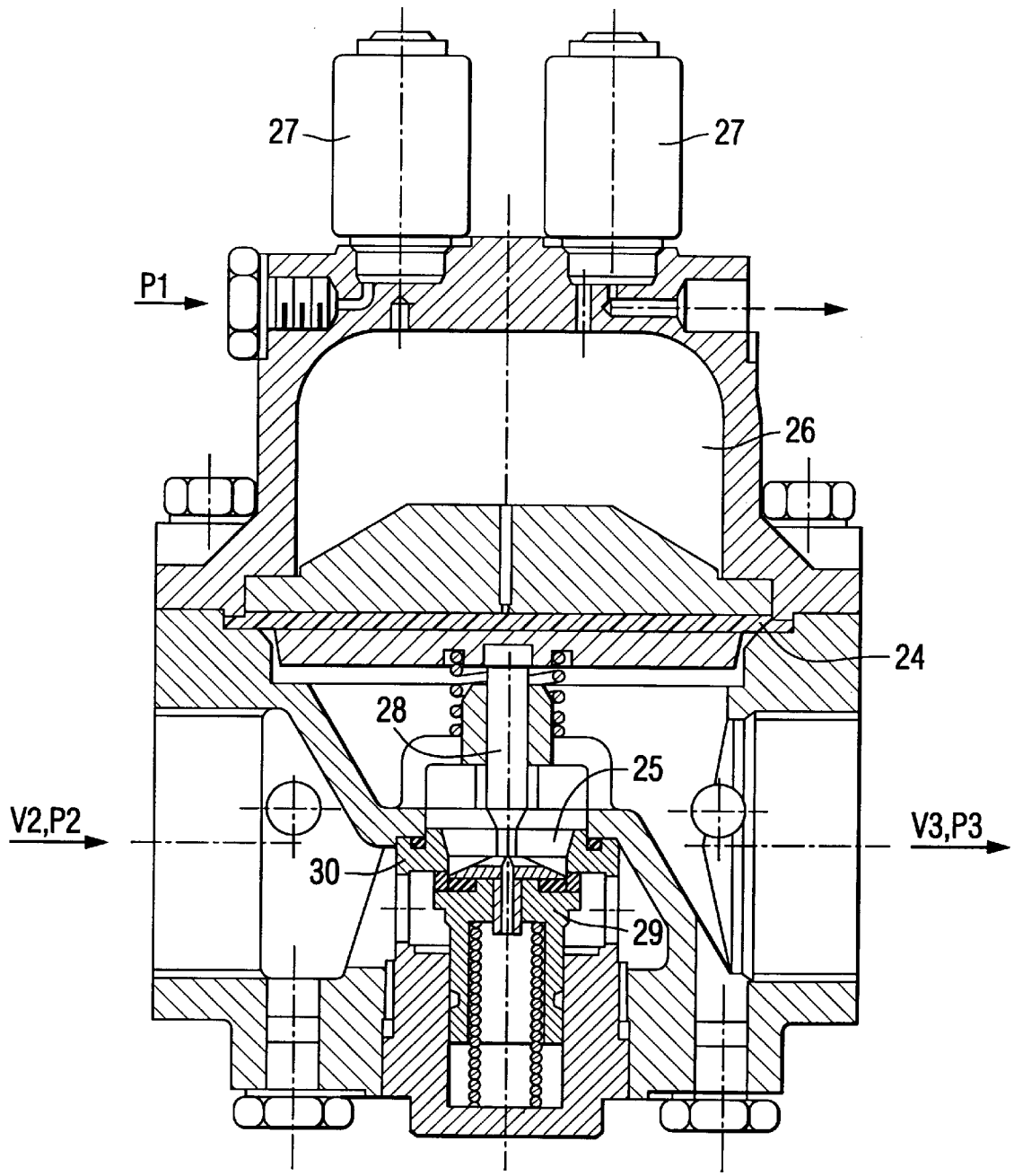
FIG. 5 shows an oxygen regulating valve for use with the separation nozzle of the present invention.

FIG. 5 shows an oxygen-regulating valve (3) that generates the necessary working pressure for the cutting oxygen of the separation nozzle (6) with very accurate adjustment and control precision.

A membrane (24) causes a valve opening (25) to open by a gas pressure inside the cupola (26) which is controlled by a supply pressure P1 through a solenoid valve (27). Besides the solenoid valve (27) for adjusting the best working pressure P3 at a throughput rate V3 based on a supply pressure P2 and an additional throughput V2, there is also a solenoid valve (27) for a controlled discharge of the cupola (28) or for completely turning off the oxygen-regulating valve (3). The gas pressure in the copula (26) works through a spring-loaded needle plug (28) on an also spring-loaded valve piece (29) that seals with a sealing edge against a sealing (30).

Figure 6:
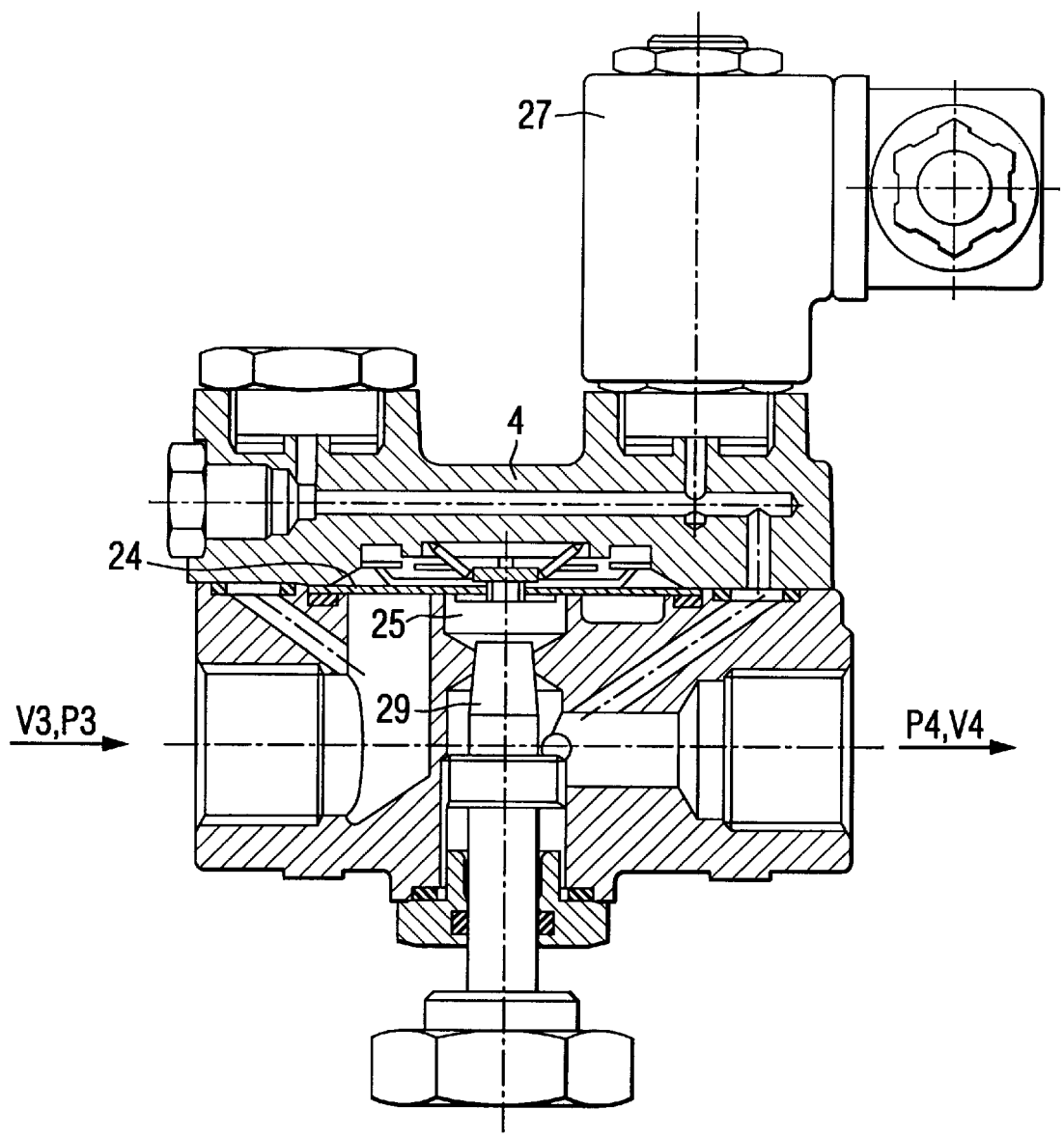
FIG. 6 shows a mass flow valve for use with the separation nozzle of the present invention.

A mass-flow valve (4) is shown in FIG. 6. Its purpose is to keep the result from pressure P4 x throughput rate V4, i.e. the amount of gas flowing into the separation nozzle (6), as constant as possible and therefore the thermochemical behavior of the cutting jet (17) in energy and chemical effect. Otherwise the cutting jet (17) emerging from the separation nozzle (6) which is not controlled by a mass-flow valve (4) is negatively influenced by a changed nozzle distance (8), contamination or wear of the nozzle and other operational circumstances. If the pre-set cutting jet (17) is hindered from flowing out by outer circumstances or if it becomes easier, this is caused by the oxygen-regulating valve (3) by the created alterations of the working pressure and is converted into an increase or decrease of the working pressure. Unfortunately this always happens under wrong signs. When the flowing out from the separation nozzle (6) is hindered, a stagnation pressure is created that causes the oxygen-regulating valve (3) to decrease the pressure although only a higher pressure could overcome the hindrance and keep the flowing out constant. Such an unwelcome effect also occurs the other way around, i.e. when the flowing out is made easier. In order to avoid such failures at least in the beginning, the mass-flow control (4) is used. When using the mass-flow control (4) shown in FIG. 6, the cutting oxygen flows to the separation nozzle (6) at open solenoid valve (27) underneath the membrane (24) through a valve opening (25) which is adjusted through the conical end of a needle plug (25) according to individual requirements. If the pre-pressure at the separation nozzle (6) changes, it has to effect cascade-like against the faster flow at the narrow valve opening (25) and underneath the membrane (24) over the valve opening's (25) edge. This is hardly possible at the slight pressure differences at the beginning and the flowing out does not change much or not at all by the oxygen-regulating valve (3). With that the operational behavior during cutting be held constant throughout a long period of time, operational disturbances and adjusting procedures at unfavorable times can be avoided.

We claim:

1. An oxygen torch system for cutting steel comprising:

a cutting torch including a cutting channel therein;

a separation nozzle in communication with the cutting channel comprising saw tooth guide channels sealed to the cutting torch; and means in communication with the cutting channel for regulating oxygen pressure and controlling oxygen mass flow to thereby maintain an oxygen working pressure of from about 20 to about 36 bar within an oxygen working pressure tolerance of about±0.1 bar.

2. The oxygen torch system of claim 1, wherein the cutting torch comprises an outlet end having saw tooth guide channels engaging the saw tooth guide channels of the separation nozzle.

3. The oxygen torch system of claim 1, wherein the separation nozzle has a length of from 25 to 45 mm and comprises an inlet passage having a diameter less than or equal to 2.6 mm and a length of at least 10 mm, and an outlet passage tapering outwardly from the inlet passage of an angle of at least 6 degrees.

4. The oxygen torch system of claim 1, wherein the separation nozzle comprises injector means for supplying low pressure oxygen to the working oxygen.

5. The oxygen torch system of claim 1, wherein the separation nozzle has a length of from 25 to 45 mm and comprises an inlet passage having a diameter greater than or equal to 2.6 mm and a length of from 6 to 10 mm, an intermediate passage in communication with the inlet passage having a diameter less than or equal to 2.6 mm and a length of from 2 to 6 mm, and an outlet passage in communication with the intermediate passage having a diameter of from 3 to 6 mm and a length of from 9.5 to 14.5 mm.

6. The oxygen torch system of claim 1, wherein the separation nozzle comprises a gas permeable inner sleeve.

7. The oxygen torch system of claim 1, wherein the oxygen pressure regulating means comprises a valve including a pressure sensitive membrane for opening and closing the valve.

8. The oxygen torch system of claim 1, wherein the oxygen mass flow controlling means comprises a mass flow valve.

9. The oxygen torch system of claim 1, wherein the means for regulating oxygen pressure and controlling oxygen mass flow comprise a single unit.

* * * * *

UNITED STATES PATENT AND TRADEMARK OFFICE
CERTIFICATE OF CORRECTION

PATENT NO. :     5,902,544

DATED      :     May 11, 1999

INVENTOR(S) :    Horst Karl Lotz et al.

It is certified that errors appear in the above-identified patent and that said Letters Patent should be corrected as shown below:

Col. 4, line 15 after (6), insert --in accordance with an embodiment of the present invention--.

Signed and Sealed this

Twenty-eighth Day of November, 2000

Attest:

Q. TODD DICKINSON

Attesting Officer

Director of Patents and Trademarks